United States Patent
Sotiropoulos

(10) Patent No.: US 10,612,589 B2
(45) Date of Patent: Apr. 7, 2020

(54) PNEUMATIC BEARING ASSEMBLY FOR A LINEAR GUIDE RAIL

(71) Applicant: Nickoloas Sotiropoulos, Glen Mills, PA (US)

(72) Inventor: Nickoloas Sotiropoulos, Glen Mills, PA (US)

( * ) Notice: Subject to any disclaimer, the term of this patent is extended or adjusted under 35 U.S.C. 154(b) by 0 days.

(21) Appl. No.: 16/006,126

(22) Filed: Jun. 12, 2018

(65) Prior Publication Data

US 2018/0363702 A1    Dec. 20, 2018

Related U.S. Application Data

(60) Provisional application No. 62/519,642, filed on Jun. 14, 2017.

(51) Int. Cl.
*F16C 29/02* (2006.01)
*F16C 33/12* (2006.01)

(52) U.S. Cl.
CPC .......... *F16C 29/025* (2013.01); *F16C 33/125* (2013.01)

(58) Field of Classification Search
CPC .... F16C 29/02; F16C 29/025; F16C 29/0683; F16C 2226/40; F16C 33/125; F16C 33/128; F16C 33/145; F16C 32/0618
See application file for complete search history.

(56) References Cited

U.S. PATENT DOCUMENTS

| | | | |
|---|---|---|---|
| 2,660,484 A * | 11/1953 | Gerard | F16C 32/0659 384/118 |
| 3,169,807 A | 2/1965 | Abel et al. | |
| 3,938,863 A | 2/1976 | Victor et al. | |
| 4,506,935 A * | 3/1985 | Suzuki | F16C 32/06 384/12 |
| 4,710,034 A | 12/1987 | Tittizer et al. | |
| 4,978,233 A * | 12/1990 | Stotzel | F16C 29/025 384/12 |
| 5,069,558 A | 12/1991 | Dinnebier et al. | |
| 5,141,337 A | 8/1992 | Hanaway | |
| 5,146,675 A * | 9/1992 | Ford | B65G 39/09 492/47 |

(Continued)

FOREIGN PATENT DOCUMENTS

JP    2006090482 A  *  4/2006

OTHER PUBLICATIONS

Machine Translation of JP-2006090482-A (Year: 2006).*

*Primary Examiner* — Alan B Waits
(74) *Attorney, Agent, or Firm* — Dunlap Bennett & Ludwig PLLC; Brendan E. Squire

(57) ABSTRACT

A pneumatic bearing assembly for a linear guide rail system. The pneumatic bearing assembly provides a substantially frictionless bearing surface between the bearing assembly and the linear guide rail system. The bearing assembly includes a bearing housing to support a payload on the guide rail system and a bearing insert in an interior chamber of the housing. A plurality of pneumatic passages communicate a pressurized pneumatic source through the bearing housing to an interior surface of the bearing insert. The unique orientation of the plurality of pneumatic passages distributes the pressurized pneumatic source to provide a pneumatic cushion between the bearing assembly and the linear guide rail system.

10 Claims, 3 Drawing Sheets

(56) References Cited

U.S. PATENT DOCUMENTS

| | | | | |
|---|---|---|---|---|
| 5,439,341 A * | 8/1995 | Yamazaki | ................ | B23Q 1/38 384/12 |
| 5,466,071 A * | 11/1995 | Slocum | ................ | F16C 29/025 384/111 |
| 5,537,929 A * | 7/1996 | Miura | ................ | B23Q 1/40 104/138.1 |
| 5,800,068 A | 9/1998 | Wanger | | |
| 6,342,306 B1 * | 1/2002 | Ozawa | .................... | B22F 7/004 384/902 |
| 7,429,132 B1 | 9/2008 | Marussich | | |
| 8,210,748 B2 | 7/2012 | Hori | | |
| 8,753,014 B2 | 6/2014 | Devitt | | |
| 9,784,312 B1 | 10/2017 | Gu et al. | | |
| 2003/0110696 A1 * | 6/2003 | Rennetaud | .............. | F16C 29/02 49/120 |
| 2004/0071374 A1 * | 4/2004 | Tomita | ................ | F16C 32/0603 384/100 |
| 2005/0249441 A1 | 11/2005 | Li et al. | | |
| 2008/0229811 A1 * | 9/2008 | Zhao | .................... | B25B 11/005 73/104 |
| 2008/0290246 A1 * | 11/2008 | Nishino | ................ | H02K 5/1675 248/674 |
| 2010/0002966 A1 * | 1/2010 | Hori | ...................... | F16C 17/107 384/100 |
| 2010/0034489 A1 * | 2/2010 | Bechtold | ............... | F16C 29/025 384/12 |
| 2010/0092113 A1 * | 4/2010 | Muneishi | .............. | F16C 29/025 384/12 |
| 2014/0153847 A1 * | 6/2014 | Yamato | ............... | F16C 32/0648 384/12 |
| 2014/0314345 A1 * | 10/2014 | Ebl | ......................... | F16C 43/02 384/12 |
| 2015/0023617 A1 * | 1/2015 | Chien | ................. | F16C 32/0618 384/12 |
| 2015/0362014 A1 * | 12/2015 | Maki | ................. | F16C 29/0609 384/44 |
| 2016/0123386 A1 * | 5/2016 | Daniel | .................. | F16C 29/088 384/15 |
| 2016/0265588 A1 | 9/2016 | Devitt et al. | | |
| 2016/0377114 A1 | 12/2016 | Dahinten | | |
| 2017/0051788 A1 | 2/2017 | Kim | | |
| 2017/0146059 A1 * | 5/2017 | Tomita | ................ | F16C 29/0602 |
| 2017/0356817 A1 * | 12/2017 | Bluemm | .............. | F16C 29/0645 |
| 2018/0066701 A1 | 3/2018 | Minami et al. | | |
| 2018/0073558 A1 * | 3/2018 | Sakai | ...................... | F16C 29/06 |

* cited by examiner

PNEUMATIC BEARING ASSEMBLY FOR A LINEAR GUIDE RAIL

CROSS-REFERENCE TO RELATED APPLICATION

This application claims the benefit of priority of U.S. provisional application No. 62/519,642, filed Jun. 14, 2017, the contents of which are herein incorporated by reference.

BACKGROUND OF THE INVENTION

The present invention relates to linear guide rails, and more particularly to bushings and bearings for linear guide rails.

Currently available linear guide bushings make contact with the rail therefore have friction. Other linear guide bushings operate with continually supported round rail guides operate in contact with the rail. Either with recirculating balls, rollers, or low friction materials.

These bearings need lubrication and even with lubrication wear due to contact with the rail. Other linear guide bushings wrap around the guide shaft and therefore can only be used with round rails that are supported only on the ends. This causes the rail to bend from the weight and force.

As can be seen, there is a need for an improved linear guide bushing that reduces contact with the rail and thus does reduces wear, friction, and noise associated with movement across the linear guide rails.

SUMMARY OF THE INVENTION

In one aspect of the present invention a pneumatic bearing assembly for a linear guide rail is disclosed. The assembly having a bearing housing with a pneumatic inlet adapted to receive a pressurized pneumatic source. A plurality of interior passages communicate the pressurized pneumatic source to an interior chamber of the housing. A notched cutout is defined along a longitudinal length of the bearing housing and is adapted to receive a beam supporting a cylindrical portion the linear guide rail. A bearing liner has an outer surface dimensioned to be received within the interior chamber of the bearing housing. The bearing liner has a distribution slot inscribed in an outer surface of the bearing liner that is in fluid communication with the plurality of interior passages of the bearing housing. A plurality of bearing slots are inscribed in an interior surface of the bearing liner, with the plurality of bearing slots in fluid communication with the distribution slot.

In some embodiments, distribution slot is a longitudinal slot defined in opposed side surfaces of the bearing liner. A radial slot intersects the longitudinal slot and extends into at least one of the plurality of bearing slots, such that the radial slot communicates the pressurized pneumatic source from the outer surface of the bearing liner to the interior surface of the bearing liner. The plurality of bearing slots are formed in a spaced apart relation along a longitudinal centerline of the bearing liner.

The bearing liner has an interior diameter dimensioned to carry a cylindrical rail of the linear guide rail. As disclosed, the pneumatic bearing imparts a substantially frictionless pneumatic bearing surface between the interior surface of the bearing liner and the cylindrical rail upon application of the pressurized pneumatic source. In other aspects of the invention, a plurality of bonding slots are defined in an exterior surface of the bearing liner and a plurality of bonding apertures defined through the bearing housing and in communication with the bonding slots. A bonding agent may be received within the plurality of bonding slots and the plurality of bonding apertures to secure the bearing liner within the bearing housing. The plurality of bonding slots may be defined from opposed ends of the bearing liner and extend to an intermediate portion of the bearing liner.

The bearing assembly has at least one mounting hole defined in the bearing housing to receive a fastener to couple a structure to be carried and supported by the bearing assembly for translation along the linear guide rail. The at least one mounting hole may be defined in a flange protruding a lateral side of the bearing housing.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
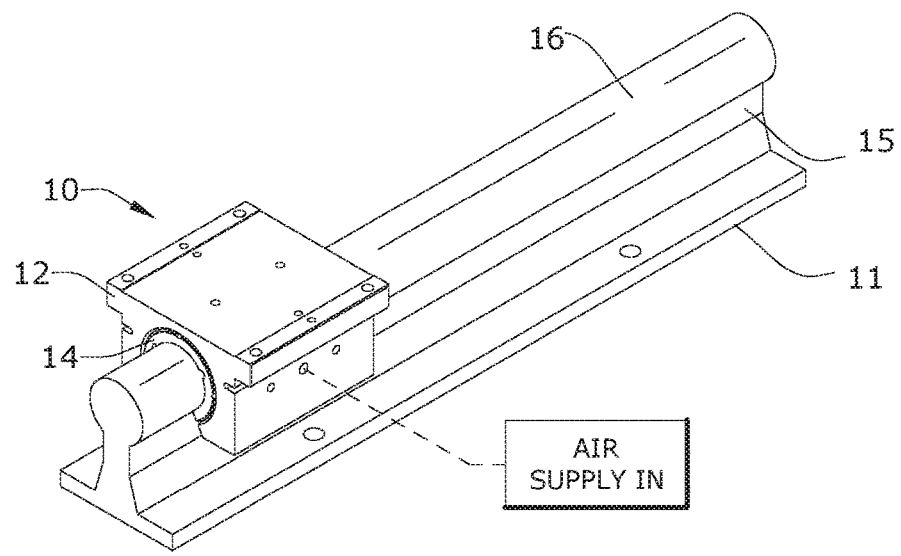
FIG. 1 is a perspective view of an embodiment of an air bearing linear guide bushing.
Figure 2:
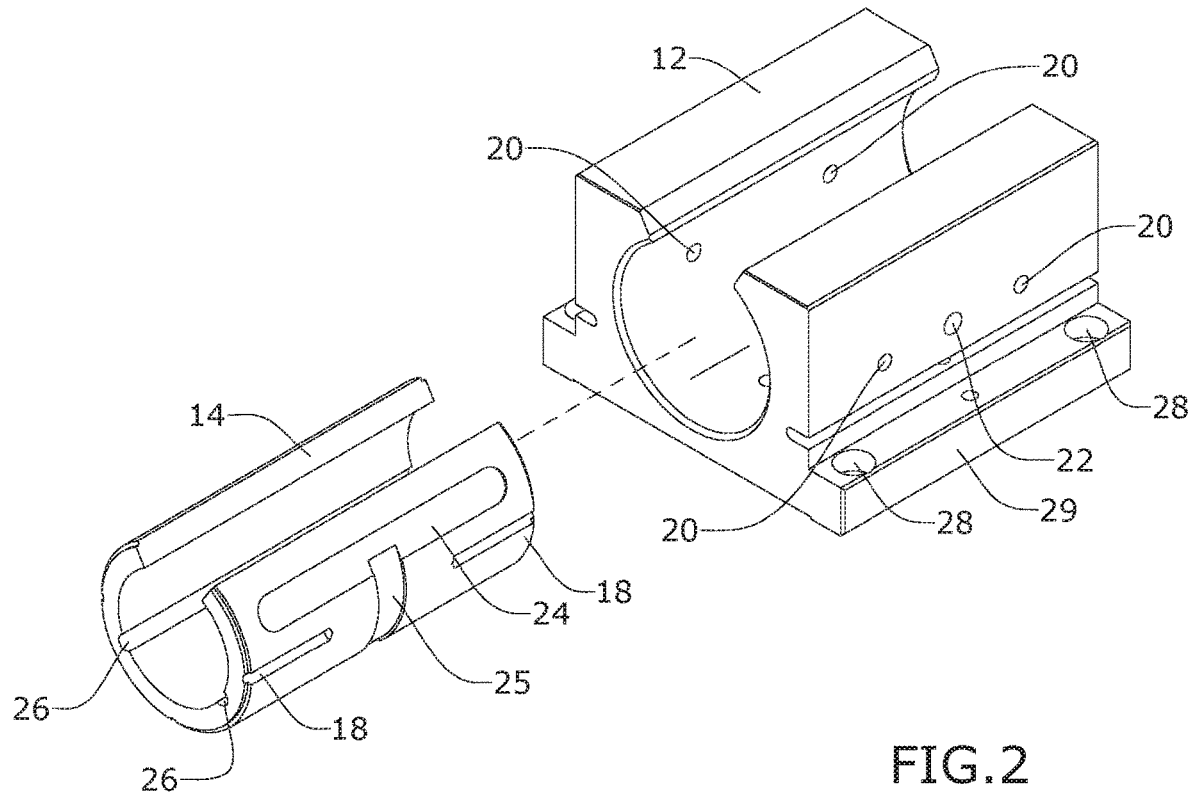
FIG. 2 is an exploded view of the air bearing linear guide bushing.
Figure 3:
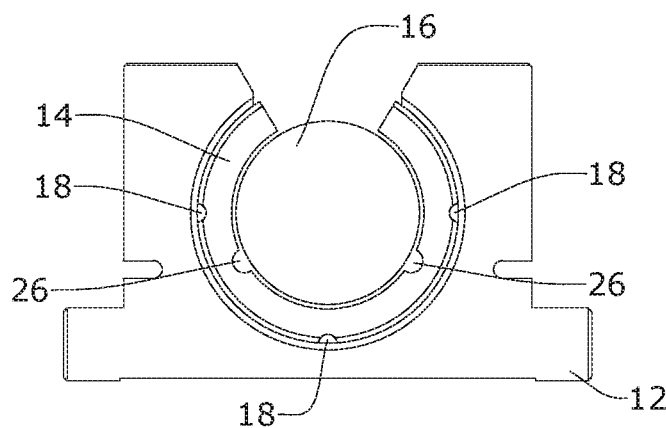
FIG. 3 is a side view of the air bearing linear guide bushing.
Figure 4:
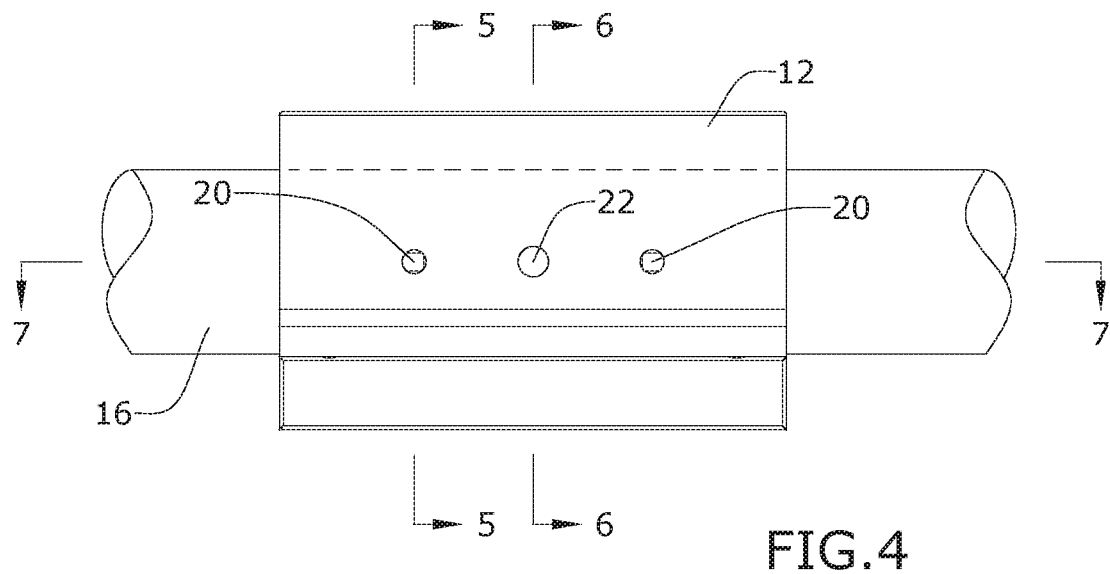
FIG. 4 is a front view of the air bearing linear guide bushing.

Broadly, embodiments of the present invention provide a substantially frictionless pneumatic bearing assembly for a linear guide rail. As seen in reference to FIG. 1, the pneumatic bearing assembly 10 is mounted to a cylindrical rail 16 supported by a beam 15 of the linear guide rail 11. A pressurized pneumatic source, such as air, is communicated to the pneumatic bearing assembly to form an air cushion between the pneumatic bearing assembly 10 and the cylindrical rail 16.

The pneumatic bearing assembly 10 includes a bearing housing 12 having at least pneumatic inlet 22 adapted to communicate a pressurized pneumatic source to an interior chamber of the housing 10. A notched cutout is defined along a longitudinal length of the bearing housing 12 and has a width sufficient to receive the beam 15 supporting the cylindrical portion 16 the linear guide rail 11. The notch permits the bearing assembly 10 to partially rotate about the cylindrical rail 16 so that the bearing assembly may accommodate flexing of a support platform coupled to the bearing assembly 10 as loads are applied to the support platform.

A bearing liner 14 has an outer surface dimensioned to be received within the interior chamber of the bearing housing 12. In the non-limiting embodiment shown, the outer surface of the bearing liner 14 is substantially cylindrical. The bearing liner 14 has a distribution slot 24 inscribed in an outer surface of the bearing liner 14 and is in fluid communication with the interior passage[s] 23 extending through the bearing housing 12 from the pneumatic inlet 22. The bearing liner 14 may be formed of a porous material to communicate the pressurized fluid from the outer surface to the inner surface.

A plurality of bearing slots 26 are inscribed in an interior surface of the bearing liner 14, with the plurality of bearing slots 26 in fluid communication with the distribution slot 24. In some embodiments, the distribution slot 24 is defined as a longitudinal slot defined in opposed exterior side surfaces of the bearing liner 14.

A radial slot 25 intersects the longitudinal slot 24 such that the radial slot 25 communicates the pressurized pneumatic source from the outer surface of the bearing liner 14 to the plurality of bearing slots 26 inscribed in the interior surface of the bearing liner 14. Preferably, the plurality of bearing slots 26 are formed in a spaced apart relation along a longitudinal centerline of the bearing liner 14.

In the embodiment shown, the plurality of bearing slots 26, includes two bearing slots 26 that effectively divide the pressurized inner diameter of the bearing liner 14 into 3 pneumatic bearing zones, replicating 3 separate bearings by providing low pressure areas between the bearing zones 27. The pneumatic bearing zones 27 allow the bushing to work in equilibrium without any load applied to the bearing liner 14 from the top of the bearing housing 12. Without the bearing slots 26, the bushing may have a tendency to shift its centerline above the centerline of the guide rail 16 and the lower edges of the bearing liner 14 can drag on the guide rail 16. In the embodiment shown, the bearing slots 26 are 120 degrees apart. The number and disposition of the bearing slots 26 can be varied to account for and accommodate a higher vertical load carrying capability, if needed. Alternatively, if the application requires, the bearing slots 26 may be disposed to provide for pneumatic suspension for a greater lateral loading.

The bearing liner 14 has an interior diameter that is dimensioned to carry the cylindrical rail 16 of the linear guide rail 11, such that it provides a substantially frictionless pneumatic bearing surface between the interior surface of the bearing liner 14 and the cylindrical rail 11 upon application of the pressurized pneumatic source. For close tolerances, the interior diameter of the bearing liner 14 may be machined after it has been assembled within the bearing housing 12.

Figure 5:
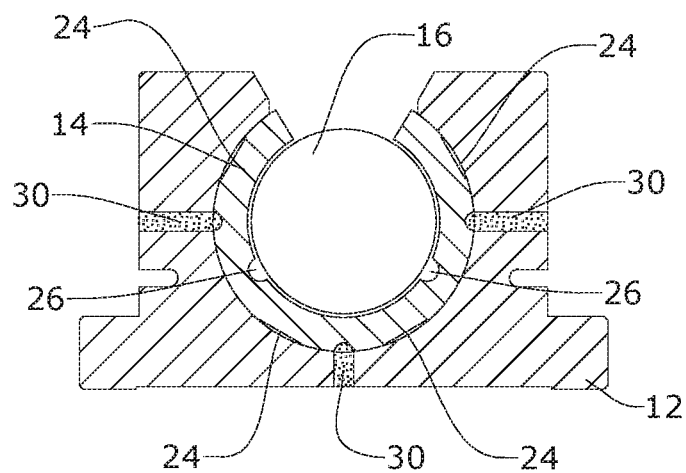
FIG. 5 is a section view taken through 5-5 of FIG. 4.

The bearing liner 14 may be removably attached to the bearing housing 12, such as by a close interference fit. In some embodiments, such as shown in reference to FIG. 5, the bearing liner 14 may also be retained by a bonding agent 30. The bonding agent 30 may be injected into one or more bonding agent apertures 20 extending through the bearing housing and in communication with a plurality of bonding slots 18 defined in an exterior surface of the bearing liner 14. The bonding slots 18 may be defined in a spaced apart relation around the outer circumference of the bearing liner 14. In the embodiment shown, the plurality of bonding slots 18 are defined from opposed ends of the bearing liner 14 and longitudinally extend to an intermediate portion of the bearing liner 14. The bonding agent 30 assists in providing a pneumatic seal between the bearing liner 14 and the bearing housing 12.

The pneumatic bearing assembly 10 includes at least one mounting hole 28 defined in an upper surface of the bearing housing 12. The mounting hole 28 is adapted to receive a fastener, such as a bolt, screw, or pin, to couple a structure that is to be carried by the bearing assembly 10 along the liner guide rail 11. The at least one mounting hole 28 may be defined in a flange 29 protruding from a lateral side of the bearing housing 12.

Figure 6:
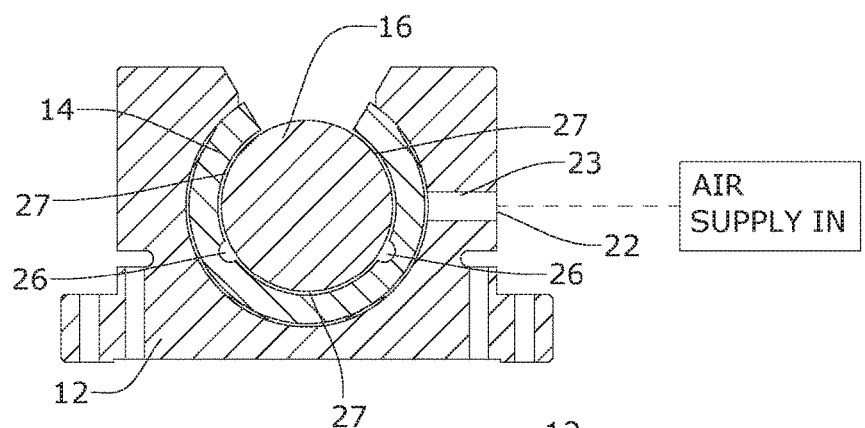
FIG. 6 is a section view through 6-6 of FIG. 4.
Figure 7:
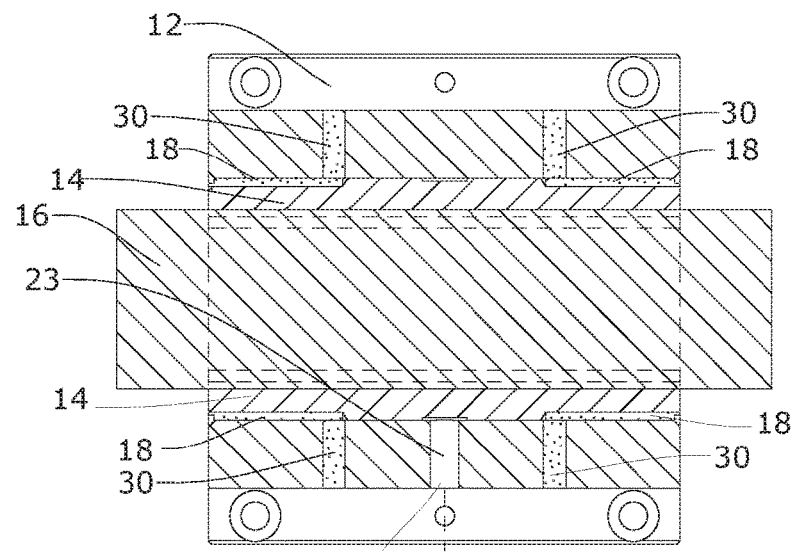
FIG. 7 is a section view through 7-7 of FIG. 4.
Figure 8:
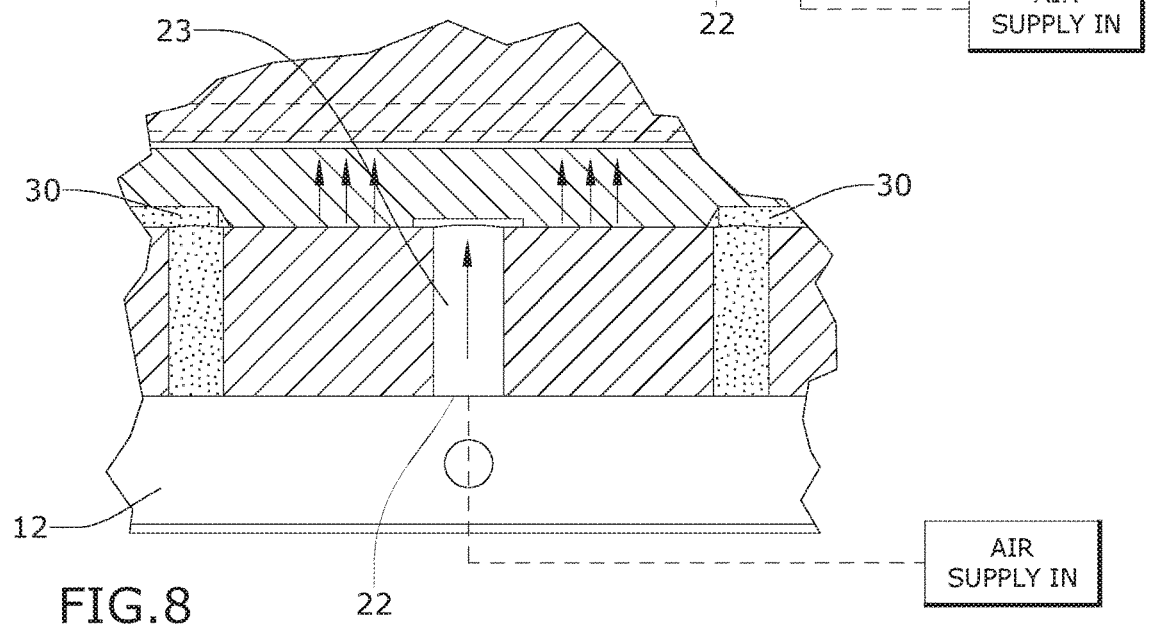
FIG. 8 is an enlarged section view of FIG. 7 illustrating the air flow.

As best seen in reference to FIGS. 6-8, in operation, the pressurized pneumatic source is communicated to the pneumatic inlet 22 and delivered to the distribution slot 24 defined along the outer surface of the bearing liner 14. From there, the pressurized pneumatic source is carried from the outer surface of the bearing liner 14 via the radial slot 25 which extends into and outer sidewall of the bearing liner 14 to the bearing slots 26 inscribed on the interior surface of the bearing liner 14. The longitudinal orientation of the bearing slots 26 along the bearing assembly 10 distributes the pressurized pneumatic source so that it produces a pneumatic cushion between the interior surface of the bearing liner 14 and the cylindrical rail 16 of the linear guide rail 11. Accordingly, the bearing assembly 10 may carry a supported structure that is affixed to the bearing housing 12 in a substantially frictionless air cushion. The pressurized pneumatic source may be regulated to a desired pressure based on the anticipated loads carried by the linear guide rail 11.

It should be understood, of course, that the foregoing relates to exemplary embodiments of the invention and that modifications may be made without departing from the spirit and scope of the invention as set forth in the following claims.

What is claimed is:

1. A pneumatic bearing assembly for a linear guide rail, comprising:
   a bearing housing having an pneumatic inlet adapted to receive a pressurized pneumatic source, an interior passage to communicate the pressurized pneumatic source to an interior chamber of the housing, and a notched cutout defined along a longitudinal length of the bearing adapted to receive a beam supporting a cylindrical portion the linear guide rail;
   a bearing liner formed of a porous material having an outer surface dimensioned to be received within the interior chamber of the bearing housing, an interior surface dimensioned to receive the cylindrical portion of the linear guide rail, the bearing liner having a distribution slot inscribed in an outer surface of the bearing liner, a radial slot circumscribing the outer surface of the bearing liner, intersecting with the distribution slot and in fluid communication with the interior passage of the bearing housing, a plurality of bearing slots inscribed along a longitudinal length of in an interior surface of the bearing liner, the plurality of bearing slots communicating the pressurized pneumatic source from a first end and a second end of the bearing housing, the plurality of bearing slots defining a plurality of pneumatic bearing zones extending along the longitudinal length of the bearing liner between the plurality of bearing slots, the bearing zones disposed to maintain a longitudinal alignment of the bearing housing with a longitudinal centerline of the guide rail.

2. The pneumatic bearing assembly of claim 1, wherein the distribution slot comprises:
   a longitudinal slot defined in opposed side surfaces of the bearing liner.

3. The pneumatic bearing assembly of claim 1, wherein the plurality of bearing slots are formed in a spaced apart relation along a longitudinal centerline of the bearing liner.

4. The air bearing assembly of claim 1, the bearing liner further comprising:
   an interior diameter dimensioned to carry a cylindrical rail of the linear guide rail; wherein a substantially frictionless pneumatic bearing surface is imparted between the interior surface of the bearing liner and the cylindrical rail upon application of the pressurized pneumatic source.

5. The pneumatic bearing assembly of claim 1, further comprising;
   a plurality of bonding slots defined in an exterior surface of the bearing liner in a spaced apart relation; and
   a plurality of bonding apertures defined through the bearing housing and in communication with the bonding slots.

6. The pneumatic bearing assembly of claim 5, further comprising:
   a bonding agent received within the plurality of bonding slots and the plurality of bonding apertures to secure the bearing liner within the bearing housing.

7. The pneumatic bearing assembly of claim 5, wherein a first set of the plurality of bonding slots are defined at a first end of the bearing liner and a second set of the plurality of bonding slots are defined at a second end of the bearing liner and each of the first set and the second set extend to an intermediate portion of the bearing liner.

8. The pneumatic bearing assembly of claim 1, wherein the bearing liner and the interior chamber are substantially cylindrical.

9. The pneumatic bearing assembly of claim 1, further comprising:
   at least one mounting hole defined in an upper surface of the bearing housing, the mounting hole adapted to receive a fastener to couple a structure to be carried by the bearing assembly.

10. The air bearing assembly of claim 9, wherein the at least one mounting hole is defined in a flange protruding a lateral side of the bearing housing.

\* \* \* \* \*